June 21, 1960     H. E. SINGLETON ET AL     2,941,406
GYRO SMOOTHING SYSTEM
Filed Sept. 30, 1955     2 Sheets-Sheet 1

INVENTORS.
HENRY E. SINGLETON
STEPHEN F. CRUMB
BY
William R. Lane
ATTORNEY

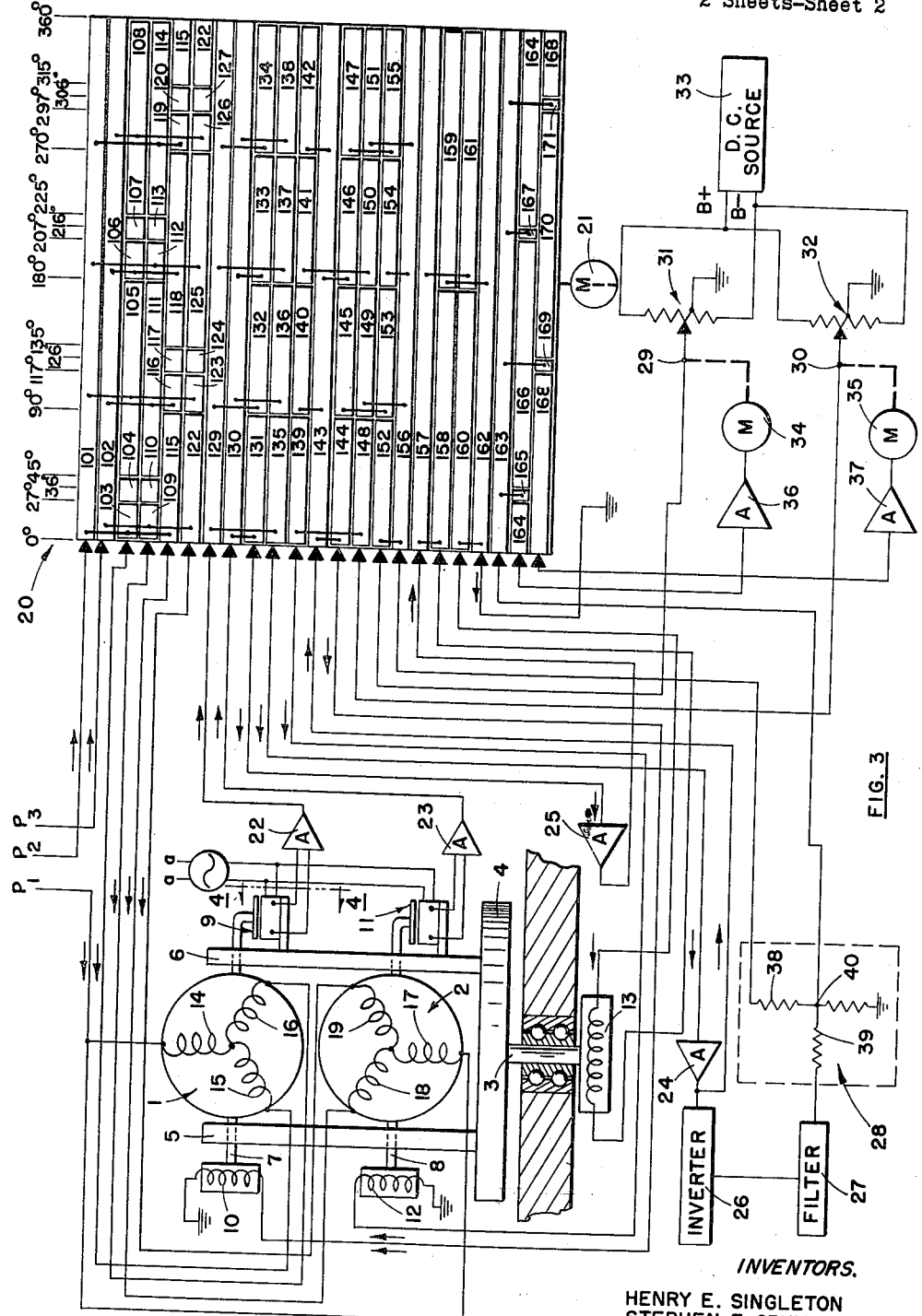

United States Patent Office

2,941,406
Patented June 21, 1960

2,941,406

GYRO SMOOTHING SYSTEM

Henry E. Singleton, Downey, Calif., and Stephen F. Crumb, Fort Worth, Tex., assignors to North American Aviation, Inc.

Filed Sept. 30, 1955, Ser. No. 537,847

10 Claims. (Cl. 74—5.37)

This invention relates to smoothing systems and particularly to a gyro smoothing system adapted to eliminate the ripple drift of a self-compensating gyro stabilized platform.

A self-compensating gyro stabilized platform is described in co-pending patent application Serial No. 200,234, filed December 11, 1950, in the name of Darwin L. Freebairn et al., entitled "Self-Compensating Gyro Apparatus." The co-pending application disclosed the utilization of two reversible gyroscopes to stabilize each axis of stabilization of the platform. While one of the gyroscopes is controlling the axis of stabilization the other gyroscope is caged. A gyroscope is caged when a pick-off on an axis actuates a torquer on the same axis in a manner to oppose any torques tending to rotate the gyroscope about that axis. The two reversible gyroscopes controlling a single axis of stabilization are called gyro #1 and gyro #2. Circuitry is provided to divide a complete cycle of operation into four periods. During the first and third periods, gyro #2 is connected to control the axis of stabilization and gyro #1 is caged. During the second and fourth periods, gyro #1 is connected to control the axis of stabilization, and gyro #2 is caged. Each time either gyroscope is caged, the spin direction of its rotor is reversed.

When gyroscopes are mass produced various imperfections in construction result in disturbing torques acting upon the gyroscope. These disturbing torques, which include bearing, lead-in, and unbalance torques, cause a progressive drift of the axis being stabilized. The greater part of the disturbing torques are independent of the spin direction of the gyroscope's rotor and create a resultant torque which tends to rotate the gyroscope about the precession axis which is normal to the axis of stabilization. The rest of the disturbing torques reverse in direction upon reversal of the spin direction of the rotor. The gyro smoothing system contemplated by this invention compensates for the first-mentioned disturbing torques which are independent of the spin direction of the gyroscope's rotor.

A generalized analysis of the effect of the disturbing torques upon the drift rate of the platform for a single gyroscopic system produces the following generalized equation:

$$M_u = H\dot{\phi}$$

where $M_u$ is the resultant torque about the precession axis caused by the disturbing torques, H is the angular momentum of the gyroscope's rotor, and $\dot{\phi}$ is the rate of drift of the axis of stabilization. Where $M_u$ and H are independent of time, the total drift angle, $\phi$, over a given time interval, $t$, is then $$\phi = \int \frac{M_u}{H} dt = \frac{M_u}{H} t$$

If a system is devised to periodically change the sign of angular momentum H, a cancellation of drift angle $\phi$ is achieved. Since $H = I\omega$, where I is the moment of inertia of the gyroscope's rotor, and $\omega$ is the angular velocity, the sign of angular momentum H is periodically changed by reversing the spin direction of the rotor of the gyroscope. The achievement of a cancellation of drift angle $\phi$ is shown by the following example: A rotor of a gyroscope with moment of inertia I and subject to disturbing torques $M_u$ is rotated at an angular velocity, $\omega_a$, during time $t_a$, and at an angular velocity, $\omega_b$, during time $t_b$. The drift angles $\phi_a$ and $\phi_b$ are given by the equations $$\phi_a = \frac{M_u}{I\omega_a} t_a$$

and $$\phi_b = \frac{M_u}{I\omega_b} t_b$$

The total drift angle after time $t_a$ and $t_b$ is the sum of $\phi_a$ and $\phi_b$, or $$\phi_a + \phi_b = \frac{M_u}{I\omega_a} t_a + \frac{M_u}{I\omega_b} t_b$$

If $$\frac{t_a}{\omega_a} = \frac{-t_b}{\omega_b}$$

the total drift angle due to disturbing torques which are independent of the spin direction of the gyroscope is reduced to zero. This is accomplished by reversing the direction of rotation of the gyroscope's rotor, making $\omega_a = -\omega_b$, and by appropriately timed switching to make $t_a = t_b$. The drift angle therefore fluctuates around a zero value. This variation of drift angle around a zero value is called ripple drift. Since a single cycle of operation may last over 400 seconds, this ripple drift causes material undesirable errors.

It is therefore an object of this invention to provide an improved gyro smoothing system for a self-compensating gyro stabilized platform.

It is another object of this invention to provide a gyro smoothing system utilizing a memory device for storing information useful in the elimination of the ripple drift of a self-compensating gyro stabilized platform.

It is a further object of this invention to provide a gyro smoothing system for a self-compensating gyro stabilized platform utilizing a memory device which stores information which is a function of the disturbing torques on each gyroscope while said gyroscope is caged and while the rotor of said gyroscope is stationary and means for utilizing this stored information in said memory device to produce a corrective torque on said gyroscope while said gyroscope is controlling the axis of stabilization, said corrective torque being substantially equal and opposite to said disturbing torques which are independent of the spin direction of said gyroscope.

It is another object of this invention to provide an improved smoothing system for a self-compensating gyro stabilized platform.

It is yet another object of this invention to provide in a smoothing system for a self-compensating gyro stabilized platform means for individually storing a signal proportional to the disturbing torques acting on the precession axis of each gyroscope of said platform while said gyroscope is nonrotating and means responsive to said signal storing means for generating a corrective torque on said gyroscope while said gyroscope is rotating which is equal and opposite to said disturbing torques.

Other objects of this invention will become apparent from the following description taken in connection with the accompanying drawings, in which Fig. 1 is a graphic plot of the platform drift angle versus time for a single cycle of operation of a self-compensating gyro stabilized platform without a smoothing system;

Fig. 3 is a schematic drawing of a preferred embodiment of the gyro smoothing system contemplated by this invention.

Figure 1:
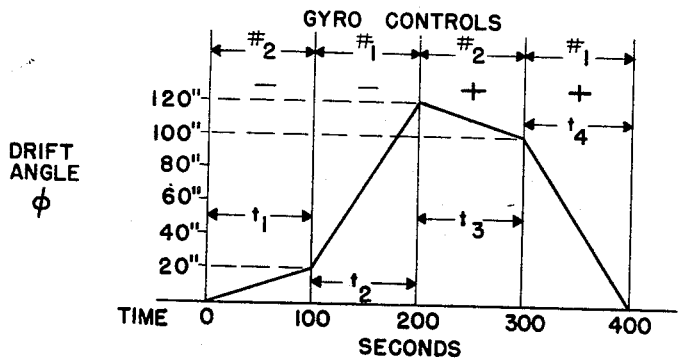
Figure 6:
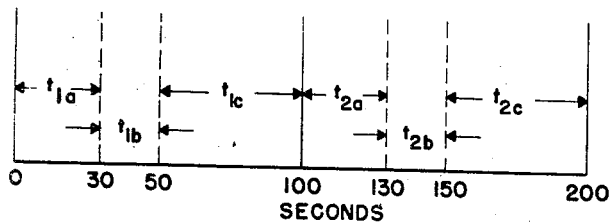
Fig. 6 is a plot of the timing of the braking, storing and reversing functions of the apparatus of Fig. 3.

Referring now to Fig. 1, a plot is shown of a single cycle of the ripple drift which appears on an output axis when a self-compensating gyro stabilized platform is operated without a smoothing system. The single cycle of operation of Fig. 1 utilizes two gyroscopes alternately controlling the axis of stabilization. The single cycle of operation is divided into four periods $t_1$, $t_2$, $t_3$ and $t_4$. During times $t_1$ and $t_3$, gyro #2 controls the axis of stabilization while gyro #1 is caged. During times $t_2$ and $t_4$, gyro #1 controls the axis of stabilization while gyro #2 is caged. Each of the gyroscopes is reversed between the periods of its control, thereby reversing the direction of the drift caused by the disturbing torques acting on that gyroscope. Times $t_1$ and $t_2$ are further subdivided into times $t_{1a}$, $t_{1b}$ and $t_{1c}$ and times $t_{2a}$, $t_{2b}$ and $t_{2c}$, respectively, as shown in Fig. 6. During time $t_{1a}$, the phase of the voltages supplied to the rotor motor or gyro #1 is reversed. Thus, assume that, during the last period of time, $t_4$, while gyro #1 was controlling the axis of stabilization, the rotor of gyro #1 was rotating in an assumed positive direction. During the next period of time, $t_{1a}$, the rotor of gyro #1 is subjected to a strong braking torque by the reversal of the phase of the applied voltage. Time $t_{1a}$ is selected of long enough duration to bring the rotor angular velocity of gyro #1 to near zero speed. It has been found that the time required for a particular gyroscope is very nearly constant, even during warm up periods. Therefore, a fixed time delay is sufficient for the switching. In the example, a time, $t_{1a}$, of 30 seconds is used as a representative value. During the next 8 to 10 seconds (the first portion of time $t_{1b}$ of Fig. 6) the rotor of gyro #1 coasts to a stop. The desired sampling of the disturbing torques acting about the precession axis of caged gyro #1 is accomplished during the latter portion of time $t_{1b}$ while the rotor is at standstill. The full reversed phase voltage is then applied to the rotor motor of gyro #1 during time $t_{1c}$. In the example of Fig. 6, time $t_{1c}$ is of 50 seconds' duration which is ample time to bring the rotor up to full speed in an assumed negative direction. During time $t_2$ gyro #1 is connected to control the axis of stabilization. A circuit which may be used to accomplish the aforementioned switching and sampling function is described later.

Similarly, during time $t_2$ gyro #2 is caged. Time $t_{2a}$ is utilized to exert a strong braking torque on the gyro's rotor bringing it to near zero angular velocity. During time $t_{2b}$ the rotor coasts to a stop, the disturbing torques acting about the precession axis of caged gyro #2 are sampled and information which is a function of those torques is stored. During time $t_{2c}$ the rotor of gyro #2 is once again brought up to full speed but in a reversed direction. It is to be noted that various lengths of times have been recited. Such times are by way of example only and not by way of limitation. The times used necessarily vary with the particular gyroscope used and the angular velocities of operation. Particular times for a particular configuration can readily be determined experimentally.

Figure 2:
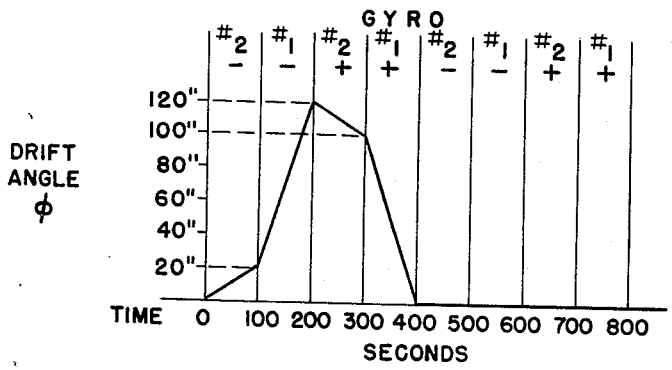
Fig. 2 is a graphic plot of the platform drift angle versus time for the first two cycles of operation of a self-compensating gyro stabilized platform utilizing the gyro smoothing system of this invention.

It can readily be seen by referring to Fig. 1 that only for comparatively short periods of time is the drift angle negligible. In view of the long periods of time needed to complete a single cycle of operation, this ripple drift is very undesirable in a precision platform. Since this ripple drift is caused by the disturbing torques acting on the gyroscope, it is eliminated by continuously subjecting the gyroscope to a counter-torque equal and opposite to the resultant of the disturbing torques. If the magnitude and direction of the disturbing torques are found during the first cycle of operation and the counter-torques applied during the second cycle of operation, the plot of drift angle versus time appears as indicated in Fig. 2 which indicates zero drift for the second and subsequent cycles. The problem is to find the magnitude and direction of the disturbing torques, to store this information and to apply a counter or corrective torque of the proper magnitude and direction to continuously counteract the disturbing torques. Various devices for performing these functions have been disclosed in copending patent application Serial No. 257,854, filed November 23, 1951, in the name of Joseph E. Picardi et al., entitled "Smoothing System;" patent application Serial No. 325,655, filed December 12, 1952, in the name of Robert M. Ashby, entitled "Electronic Smoothing System" and patent application Serial No. 338,291, filed February 24, 1953, in the name of Charles Belove, entitled "Magnetic Smoothing System." Each of these applications utilize apparatus for measuring the disturbing torques while the rotors of the gyroscopes are spinning at full velocity. When the gyroscopes are spinning at full velocity, assuming gyro #2 is controlling the axis of stabilization while gyro #1 is caged, an input torque about the axis of stabilization tends to cause precession about the output axis of each gyroscope. Gyro #2 counteracts this precession tendency by actuating a torquer to exert a torque to the platform about the axis of stabilization which counteracts this input torque. The caging signal of gyro #1 is affected both by the initial input torque and by the balancing counter torque. Thus, the caging signal includes as a component a small noise level not caused by the disturbing torques acting about its output axis. This noise or ripple is caused by external torques acting about the axis of stabilization and torques from the platform torquer. Therefore, the caging signal, if measured while the rotor of gyro #1 is spinning, contains slight errors not caused by the disturbing torques. By a circuit to be described later, the gyro smoothing system of this invention eliminates this error.

Basically, the caging torque, $M_{1+}$ of caged gyro #1 during the time its rotor is spinning in the assumed positive direction is $$M_{1+} = -(M_{u1} + H_1\dot{\phi}_2) \qquad (1)$$

while the caging torque, $M_{1-}$, of caged gyro #1 during the time its rotor is spinning in the assumed negative direction is $$M_{1-} = -(M_{u1} - H_1\dot{\phi}_2) \qquad (2)$$

where $M_{u1}$ is the resultant torque about the precession or output axis of gyro #1 caused by the disturbing torques acting about the output axis of gyro #1, $H_1$ is the angular momentum of the rotor of gyro #1, and $\dot{\phi}_2$ is the drift rate of the axis of stabilization while gyro #2 is in control. The drift rate $\dot{\phi}_2$ is not only a function of the ratio $M_{u2}/H_2$, where $M_{u2}$ is the resultant torque of the disturbing torques on gyro #2 and $H_2$ is the angular momentum of the rotor of gyro #2, but also includes the aforementioned noise from stabilization axis input torques and counter torques. When the angular velocity of the rotor of gyro #1 is reduced to zero before measuring the caging torque, Equations 1 and 2 reduce to $$M_{1+} = -M_{u1}$$
$$M_{1-} = -M_{u1}$$

since $H_1$ is then equal to zero.

Figure 4:
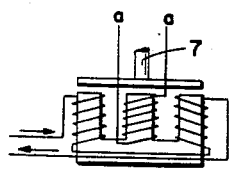
Fig. 4 is a view of a pick-off viewed along the lines 4—4 in Fig. 3.

Referring now to the schematic drawing of Fig. 3, a preferred embodiment of the smoothing system contemplated by this invention is shown. Two gyroscopes 1 and 2 are positioned with their input axes coincident with the axis of stabilization which is defined by the center line of shaft 3. Shaft 3 supports platform 4. Mounted on gyroscope platform 4 are supporting brackets 5 and 6. Shafts 7 and 8 are supported by brackets 5 and 6 and define the precession axes of gyroscopes 1 and 2, respectively. Pick-off 9, shown in detail in Fig. 4 is positioned to detect rotational movement of shaft 7. Corrective torquer 10 is positioned to apply torques about shaft 7 in response to electrical signals. Pick-off 11, which is similar to pick-off 9, is positioned to detect rotational movement of shaft 8. Corrective torquer 12 is positioned to apply torques about shaft 8. Main platform torquer 13 is positioned to apply torques about shaft 3 in response to electrical signals.

Figure 5:
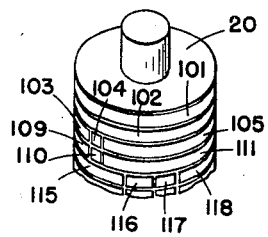
Fig. 5 is a perspective view of a portion of the drum switch of the gyro smoothing system of Fig. 3.

The rotor of gyroscope 1 is driven at synchronous speed by a motor having three-phase stator windings 14, 15 and 16. The rotor of gyroscope 2 is driven at synchronous speed by a motor having three-phase stator windings 17, 18 and 19. A source of constant frequency, three-phase power (not shown) is connected to the three-phase gyroscope windings, either directly, as between $P_1$ and windings 14 and 17; or indirectly, through appropriate strips on drum switch 20, as between phases $P_2$ and $P_3$ and windings 15, 16, 18 and 19. Drum switch 20 consists of a plurality of cylindrical strips, shown flat in Fig. 3 for convenience, driven at a synchronous speed by motor 21. A perspective view of a portion of cylindrical drum 20 is shown in Fig. 5. Contact to each strip from external circuitry is made by means of a brush. Each strip is electrically insulated from every other strip and from the separate segments of the same strip as evidenced by breaks in the individual strips. Internal connections, selectively connecting the various segments, are indicated in Fig. 3 by the heavy vertical line with a heavy dot to indicate contact with a given strip or segment of strip. Since the strips are actually cylindrical instead of flat, rotation of drum 20 by motor 21 will repeat the switching sequence at a predetermined frequency. In the example described, this frequency is one cycle every 400 seconds. One complete cycle of operation of drum switch 20 from 0° to 360° is shown in Fig. 3.

The operation of the gyro smoothing system of this invention can best be described by following through a single cycle of operation explaining each of the various circuits. The braking and periodic reversal of the spin direction of the rotors of gyroscopes 1 and 2 is obtained by selectively reversing the connections between two of the windings of each gyroscope and the source of three-phase power. Phase $P_1$ of the three-phase source is connected directly to windings 14 and 17 of gyroscopes 1 and 2, respectively. Phase $P_2$ is connected through a brush to strip 101 of drum 20. Since strip 101 is connected internally on drum 20 to strips 103 and 115, and since from 0° to 27° rotation of drum 20 strips 103 and 115 are connected via the brushes to windings 15 and 18, respectively, the circuit is completed between phase $P_2$ and windings 15 and 18 of gyroscopes 1 and 2, respectively. Phase $P_3$ is connected to strip 102. Strip 102 is connected internally to strips 109 and 122. Since from 0° to 27° rotation of drum 20 strips 109 and 122 are connected via the brushes to windings 16 and 19, respectively, the circuit is completed between phase $P_2$ and windings 16 and 19 of gyroscopes 1 and 2, respectively. An inspection of the drum for the angular position between 315° and 360° shows that during that period of time windings 18 and 19 were still connected via the brushes to strips 115 and 122. Therefore, the rotor of gyroscope 2 continues to rotate in the same direction. It is to be further noted, however, that windings 15 and 16 during the interval from 315° and 360° were connected via the brushes to strips 108 and 114, respectively.

Therefore, because of the reversal of the connections between windings 15 and 16 of the rotor motor of gyroscope 1 and the three-phase source, the rotor is subjected to a strong braking torque during the interval from 0° to 27° rotation of drum switch 20. This time interval in the example is equivalent to 30 seconds which with the particular gyroscope and angular velocity used was found experimentally to be of sufficient length to almost stop the rotor. Under ideal conditions, the voltages to the rotor windings should be removed the instant the rotor stops. However, it has been found sufficient to approximate the stopping and allow the rotor to coast to a stop before sampling the disturbing torques.

Since gyroscope 2 is controlling the axis of stabilization, windings 18 and 19 are continuously connected to phases $P_2$ and $P_3$, respectively, during the full 100 seconds from 0° to 90° rotation of drum switch 20. As noted above, windings 15 and 16 are subjected to voltages which brake the rotor of gyroscope 1 to a stop during the first 30 seconds while drum switch 20 is rotating from 0° to 27°. During the next 20 seconds while drum switch 20 is rotating from 27° to 45°, windings 15 and 16 are disconnected from any source of power since the brushes connecting these windings to the drum switch 20 are making contact with segments 104 and 110, respectively. It is noted that segments 104 and 110 are insulated from all other segments of the drum switch. During this interval, the rotor of gyroscope 1 coasts to a stop and the desired sampling, to be described later, takes place. During the next 50 seconds from 45° to 90° rotation of drum switch 20, the full voltage from the three-phase source is reapplied to the windings of the rotor motor of gyroscope 1. Thus windings 15 is connected via the brush and segments 105 and 101 to phase $P_2$ while winding 16 is connected via the brush and segments 111 and 102 to phase $P_3$. The rotor of gyroscope 1 thus is allowed to come up to full speed in an assumed negative direction of rotation preparatory to taking over control of the axis of stabilization during $t_2$ (90° to 180° rotation of drum 20).

A similar sequence of events takes place with respect to the rotor of gyroscope 2 during time $t_2$. Thus the rotor is braked substantially to a stop from 90° to 117° rotation of drum switch 20, the windings are isolated from the voltages from 117° to 135° rotation of drum switch 20, and the full voltage, with the winding connections to windings 18 and 19 reversed, during the interval from 135° to 180° rotation of drum switch 20. During time interval $t_3$ (180° to 270° rotation of the drum switch) and time interval $t_4$ (270° to 360° rotation of the drum switch) similar braking, disconnecting and starting functions are accomplished with respect to gyroscope 1 and gyroscope 2, respectively.

The alternation of the control of the axis of stabilization between gyroscopes 1 and 2 while simultaneously caging the gyroscope which is not in control, is accomplished by utilizing another set of strips on drum switch 20. "E" type inductive pick-off 9, shown in detail in Fig. 4, is positioned with its armature attached to shaft 7. The winding around the center core of pick-off 9 is connected to a source (not shown) of 400 c.p.s. A.-C. potential indicated by connection "a—a." The output of pick-off 9 is fed to detector amplifier 22 which has a D.-C. output the amplitude and polarity of which is proportional to the magnitude and direction, respectively, of rotation of shaft 7 from a neutral position. A similar "E" type inductive pick-off 11 is positioned with its armature attached to shaft 8. The winding around the center core of pick-off 11 is also connected to the source of 400 c.p.s. A.-C. potential. The output of pick-off is fed into detector amplifier 23 which has a D.-C. output the amplitude and polarity of which is proportional to the magnitude and direction, respectively, of rotation of shaft 8 from a neutral position.

Initially, the output of pick-off 9 is connected to actuate torquer 10 by means of amplifier 22, strips 129 and 135, caging amplifier 24, and strips 143 and 144. The torque applied to shaft 7 by torquer 10 is in a direction to maintain the armature of pick-off 9 in its neutral position. Gyroscope 1 is therefore effectively caged. Initially, the output of pick-off 11 is connected to actuate main torquer 13 by means of amplifier 23, strips 130 and 131, main torquer amplifier 25, and strips 157 and 158. The other terminal of main torquer 13 is connected to ground by means of strips 160 and 162. Gyroscope 2 is therefore initially in control of the axis of stabilization.

Every quarter cycle of operation the control over the axis of stabilization is switched between gyroscopes 1 and 2 and the noncontrolling gyroscope is caged. Thus, after 90° rotation of drum switch 20, gyroscope 1 is placed in control of the axis of stabilization. This is accomplished by connecting the output of pick-off 9 to main torquer 13 by means of amplifier 22, strips 129 and 132, main torquer amplifier 25, and strips 157 and 158. At the same time gyroscope 2 is caged. Thus, the output of pick-off 11 is connected to actuate torquer 12 by means of amplifier 23, strips 130 and 136, caging amplifier 24, and strips 143 and 140. Similar interchange of the control and caging functions are accomplished after 180°, 270° and 360° rotation of drum switch 20. It is to be noted that the connections to main torquer 13 are also reversed at the 180° position of the drum switch. This is done to compensate for the aforementioned reversal of the spin direction of the rotors of the gyroscopes. Assume by way of example that the rotor gyroscope 1 is spinning in a negative direction and that gyroscope 1 is controlling the axis of stabilization, an input torque about the axis of stabilization causes gyroscope 1 to tend to precess in a given direction. Torquer 13 is actuated by a signal of a given polarity to counteract this precession. If now, the rotor of gyroscope 1 is spinning in a positive direction, the same input torque about the axis of stabilization causes precession of gyroscope 1 in the opposite direction. Therefore, the connections between pick-off 9 and torquer 13 must be reversed in order to supply a signal of the correct polarity to torquer 13. This is accomplished by utilizing strips 157—162 of drum switch 20.

Thus far circuitry has been described which periodically switches the control function between the two gyroscopes, which cages the gyroscope which is not in control, and which accomplishes the stopping and reversal of the spin direction of the rotor of the caged gyroscope. The gyro stabilized system thus far described is subjected to the undesired ripple drift shown in Fig. 1. The circuits used to eliminate this ripple drift utilizes the outputs of caging amplifier 24 at the times when the rotors of the gyroscopes are stopped to obtain signals which are predetermined functions of disturbing torques $M_{u1}$ and $M_{u2}$.

Referring now to Fig. 3 the output of caging amplifier 24 is coupled through inverter 26 and filter 27 to comparison network 28. It is to be noted that during time $t_{1b}$ the output of caging amplifier 24 is unaffected by the torques about the axis of stabilization since the rotor of gyroscope 1 has completely stopped. That output is therefore a very accurate measure of the resultant of the disturbing torques acting on gyroscope 1 about the axis of shaft 7. By storing information proportional to this signal output and by subsequently applying, in response to this stored information, a torque about the axis of shaft 7 which is equal and opposite to that resultant of the disturbing torques while gyroscope 1 is controlling the axis of stabilization, the ripple drift of Fig. 1 is eliminated. In the embodiment of this invention shown in Fig. 3, the positions of wipers 29 and 30 of potentiometers 31 and 32 respectively are made a function of the outputs of caging amplifier 24 while rotors of gyroscopes 1 and 2, respectively, are stopped.

Potentiometers 31 and 32 are connected across constant D.-C. voltage source 33. One of the ends of each potentiometers 31 and 32 is connected to a terminal of source 33 which is a constant D.-C. voltage positive with respect to ground, indicated as B+ in Fig. 3, while the other ends of potentiometers 31 and 32 are connected to a terminal of source 33 which is a constant D.-C. voltage negative with respect to ground, indicated as B— in Fig. 3. The center taps of potentiometers 31 and 32 are grounded. Therefore, wipers 29 and 30 pick-off D.-C. voltages the magnitudes and polarities of which are determined by the positions of the wipers. The positions of wipers 29 and 30 are changed by D.-C. motors 34 and 35, respectively, in response to signals from amplifiers 36 and 37, respectively.

While drum switch 20 is rotating from 36° and 45° gyroscope 1 is caged with its rotor stopped by the circuitry previously described. Wiper 29 is connected through strips 152 and 156 to resistor 38 of comparator network 28. As previously noted, the output of caging amplifier 24 is inverted by inverter 26, filtered by filter 27 and connected as an input to resistor 39 of comparator 28. Comparator 28 is essentially a summing network in which terminal 40 acquires a potential which is proportional to the algebraic sum of the two voltage inputs. As long as the two voltages are of opposite polarity and of predetermined relative magnitudes, the potential at terminal 40 is ground. If, for example, the potential input from filter 27 increases in an assumed negative direction, the potential on terminal 40 becomes slightly negative. This potential is connected from terminal 40 through strips 163 and 165 to the input to amplifier 36. As a result amplifier 36 actuates motor 34 to drive wiper 29 in a direction to increase the potential picked off by wiper 29. When the two voltage inputs to comparator 28 again reach their predetermined ratio the potential at terminal 40 is again at ground and motor 34 ceases to drive wiper 29. Thus, wiper 29 is driven to a position which is a function of the output from caging amplifier 24 while the rotor of gyroscope 1 is stopped. The connection between terminal 40 and amplifier 36 is broken by the ending of strip 165 during the time drum switch 20 is rotating from the 45° position to the 216° position. Thus, once set to conform with the desired measurement, the position of wiper 29 is unchanged during this time interval.

From 90° to 180° rotation of drum switch 20, gyroscope 1 is in control of the axis of stabilization. Substantially the same disturbing torques are impressed about the axis of shaft 7 tending to cause the undesired drift shown during time $t_2$ of Fig. 1. However, a countertorque equal and opposite to the resultant of these disturbing torques is now impressed about the axis of shaft 7 by torquer 10. Torquer 10 is actuated through strips 145 and 153 by the potential picked off by wiper 29. As previously pointed out, this potential is a predetermined function of the disturbing torques on gyroscope 1. Therefore, the control of the axes of stabilization no longer drifts as indicated in Fig. 1 but becomes a straight line with substantially zero drift as shown after time $t_2$ in Fig. 2.

By a similar circuit the resultant of the disturbing torques acting about the axis of shaft 8 of gyroscope 2 is measured and converted into a position of wiper 30 during the interval from 126° to 135° rotation of drum switch 20. Thus, the output of caging amplifier 24 is again fed through inverter 26 and filter 27 to resistor 39 of comparator 28. Wiper 30 is connected by means of strips 149 and 156 to resistor 38 of comparator 28. Terminal 40 of comparator 28 is connected by means of strips 163 and 169 to amplifier 37 which in turn actuates motor 35 to drive wiper 30 in a direction and of a magnitude to create a balance between the two input voltages to comparator 28. This closed servo loop is broken at the 135° position by the termination of strip 169 and as a result wiper 30 maintains its position until the 306° position of drum switch 20 is reached.

Between 180° and 270° rotation of the drum switch wiper 30 is connected by means of strips 150 and 141 to torquer 12. Torquer 12 thus impresses a torque about shaft 8 which is equal and opposite to the resultant of the disturbing torques during time $t_3$ while gyroscope 2 is controlling the axis of stabilization. The drift of the axis of stabilization during time $t_3$ is thereby eliminated.

Periodically, wipers 29 and 30 are reset to compensate for any changes in the distributing torques. Thus, each time the rotor of gyroscope 1 is stopped (from 36° to 45° and from 216° to 225° rotation of drum switch 20) the position of wiper 29 is reset by the above-mentioned circuitry to conform with the resultant of the disturbing torques acting on gyroscope 1. Similarly, each time the rotor of gyroscope 2 is stopped (from 126° to 135° and from 306° to 315° rotation of drum switch 20) the position of wiper 30 is reset to conform with the resultant of the disturbing torques acting on gyroscope 2. Whenever gyroscope 1 is in control of the axis of stabilization (from 90° to 180° and from 270° to 360° rotation of drum switch 20) the potential on wiper 29 is coupled to actuate torquer 10 in a direction and of a magnitude to produce a correcting torque which completely counteracts the disturbing torques on gyroscope 1. Similarly, whenever gyroscope 2 is in control of the axis of stabilization (from 0° to 90° and from 180° to 270° rotation of drum switch 20) the potential on wiper 30 is coupled to actuate torquer 12 in a direction and of a magnitude to produce a corrective torque which completely counteracts the disturbing torques on gyroscope 2.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for stabilizing a device about a single axis in space comprising a pair of periodically reversing gyroscopes having their input axes parallel to said single axis in space, means for applying controlling torques to said device about said single axis in space in response to each of said gyroscopes in turn to stabilize said device, means for periodically stopping and reversing the rotation of the rotor of each of said gyroscopes while the other of said gyroscopes is controlling said device torquing means, means for individually storing signals which are functions of the disturbing torque about the precession axis of each of said gyroscopes while its rotor is stopped, and torquing means responsive to said stored signals of said storing means and positioned to apply corrective torques to each of said gyroscopes to compensate for said disturbing torque.

2. An apparatus for stabilizing a device about a single axis in space comprising a pair of reversible gyroscopes having their input axes parallel to said single axis in space, means for controlling the orientation of said device alternately in response to each of said gyroscopes to stabilize said device, servo means on each of said gyroscopes connected to cage said gyroscope when not in control of the orientation of said device, means for periodically stopping for a predetermined period of time the rotation of each of said gyroscopes while caged, means for periodically reversing the spin direction of each of said gyroscopes while caged, memory means connected to individually store signals which are predetermined functions of the torque required to cage each of said gyroscopes while said gyroscope is stopped and torquing means on each of said gyroscopes responsive to said stored signals of said memory means and positioned to apply corrective torques to each of said gyroscopes corresponding to said caging torques while said gyroscope is controlling the orientation of said device in space.

3. An apparatus for stabilizing a device about a single axis in space comprising a pair of reversible gyroscopes having their input axes parallel to said single axis in space, means for controlling the orientation of said device alternately in response to each of said gyroscopes to stabilize said device, servo means on each of said gyroscopes connected to cage said gyroscope while not controlling the orientation of said device, means for periodically braking the rotors of each of said gyroscopes substantially to a stop and reversing its spin direction while said gyroscope is caged, signal generating means connected to produce electrical signal outputs which are predetermined functions of the caging torques generated by each of said servo means while said gyroscope is stopped, means for individually storing the signal output of said signal generating means for each of said gyroscopes while caged and substantially stopped, and torquing means on each of said gyroscopes and connected to be responsive to the corresponding stored signal of said storing means while said gyroscope is controlling said single axis in space, said torquing means being positioned to apply corrective torques to said gyroscope which are substantially equivalent to the caging torques applied to said gyroscope while caged and substantially stopped.

4. Means for stabilizing a device about an axis in space comprising a pair of periodically reversing gyroscopes having their input axes parallel to said axis in space, means for applying controlling torques to said device about said axis in space in response to each of said gyroscopes in turn to stabilize said device, servo means connected to cage each of said gyroscopes about its precession axis when said gyroscope is not controlling said axis in space, signal generating means connected to generate signal outputs which are predetermined functions of the energy required to cage said gyroscopes, means for reversing and periodically stopping the rotation of the rotor of each of said gyroscopes for a predetermined interval of time while caged, means for individually storing the signal outputs of said signal generating means during said intervals of time, and torquer means positioned to apply corrective torques to each of said gyroscopes in response to the corresponding stored signals on said recording means while said gyroscope is controlling said axis in space.

5. Means for stabilizing a device about a single axis in space comprising a pair of periodically reversing gyroscopes having their input axes parallel to said single axis in space; means for applying controlling torques to said device about said single axis in space in response to each of said gyroscopes in turn to stabilize said device; a pick-off on the precession axis of each of said gyroscopes, said pick-off generating electric signal outputs which are functions of the magnitude and direction of rotation of said gyroscope about its precession axis; a caging torquer positioned to exert corrective torques about the precession axis of each of said gyroscopes; means responsive to each of said pick-offs while its corresponding gyroscope is not controlling said single axis in space and connected to actuate the corresponding caging torquer in a manner to continuously counteract the disturbing torques tending to rotate said noncontrolling gyroscope about its precession axis to thereby cage said gyroscope; means for reversing and periodically stopping the rotation of the rotor of each of said gyroscopes while caged for a predetermined interval of time; memory means connected to individually store signals which are a predetermined function of the outputs of the pick-offs of each of said gyroscopes while said gyroscope is caged and its rotor substantially stopped; and means for actuating the caging torquer on each of said gyroscopes while said gyroscope is controlling said single axis in space in response to the stored signals in said memory means corresponding to said gyroscope.

6. An apparatus for stabilizing a device about a single axis in space comprising a pair of reversible gyroscopes having their input axes parallel to said single axis in space; means for controlling the orientation of said device alternately in response to each of said gyroscopes to stabilize said device; servo means on each of said gyroscopes connected to cage said gyroscope when not controlling the orientation of said device; means for periodically stopping the spinning of the rotor of each of said gyroscopes for a predetermined length of time while caged; means for periodically reversing the spin direction of each of said gyroscopes while caged; memory means connected to each of said servo means in a manner to individually store signals which are predetermined functions of the torques required to cage each of said gyroscopes while its rotor is stopped; and torquing means selectively responsive to the stored signals of said memory means and positioned to continuously apply a corrective torque to each of said gyroscopes whereby the disturbing torques acting on said gyroscopes are continuously compensated for to the extent that said disturbing torques are independent of the spin direction of said gyroscopes.

7. A gyroscope smoothing system for eliminating ripple drift caused by disturbing torques which act about the output axis of said gyroscope comprising a periodically reversible gyroscope; servo means connected to cage said gyroscope during predetermined time intervals; means for substantially stopping for a predetermined period of time the rotation of the rotor of said gyroscope while caged; memory means connected to said servo means while said rotor is substantially stopped in a manner to store signals which are predetermined functions of the torques required to maintain said gyroscope caged; means for periodically reversing the spin direction of the rotor of said gyroscope while caged; and torquer means including a portion of said servo means responsive to said stored signals of said memory means and positioned to continuously apply a corrective torque to said gyroscope in opposition to said disturbing torques.

8. A gyroscope smoothing system for eliminating progressive drift caused by disturbing torques acting about the output axis of said gyroscope comprising a gyroscope; servo means connected to cage said gyroscope periodically for predetermined intervals of time; means for reversing and substantially stopping for a predetermined period of time the rotation of the rotor of said gyroscope while caged; memory means connected to said servo means while said rotor is substantially stopped in a manner to store signals which are predetermined functions of the torques required to maintain said gyroscope caged; and torquer means responsive to said stored signals of said memory means and positioned to continuously apply a corrective torque to said gyroscope in opposition to said disturbing torques.

9. A gyroscope smoothing system for eliminating the ripple drift about an axis of a self-compensating gyro stabilized platform comprising a pair of periodically reversed gyroscopes having their input axes parallel to said platform axis; a platform torquer positioned to apply controlling torques to said platform about said platform axis in response to electric signals to stabilize said platform; pick-offs positioned on each of said gyroscopes and adapted to produce electrical signals sensitive to the direction and magnitude of rotation from a predetermined neutral position of the corresponding gyroscope about its precession axis; gyroscope torquers positioned on each of said gyroscopes in a manner to apply torques to the corresponding gyroscope about its precession axis; switching means alternately connecting said platform torquer to the output signals of said pick-offs; servo means connected to cage the gyroscope whose pick-off is not connected to said platform torquer by subjecting the gyroscope torquer of said gyroscope to the output signals of said pick-off; means for reversing and periodically reducing the spin velocities of the rotors of each of said gyroscopes to substantially zero while caged; memory means connected to individually store signals which are predetermined functions of the outputs of the pick-offs of each of said caged gyroscopes while the spin velocity of said rotor of said gyroscope is substantially zero; and means responsive to said stored signals on said memory means for subjecting said gyroscope torquers of each of said gyroscopes to electrical signals substantially equal to the signals impressed on said gyroscope torquer while said gyroscope was caged and its spinning substantially stopped.

10. Gyroscopic apparatus compensated for disturbing torques acting on a gyroscope thereof, comprising a gyroscope having a rotor, means for reversing the spin direction of said rotor during a selected time interval and stopping the spin thereof during said interval, means for caging said gyroscope substantially throughout said time interval, memory means having an input from said caging means while said rotor spin is stopped for storing a signal indicative of the torque required to effect said caging, and means responsive to said memory means during a time subsequent to said time interval for applying a corrective torque to said gyroscope in opposition to said disturbing torques.

References Cited in the file of this patent

UNITED STATES PATENTS

| 2,414,291 | Evans | Jan. 14, 1947 |
| 2,566,305 | Beacon | Sept. 4, 1951 |
| 2,752,790 | Draper | July 3, 1956 |

FOREIGN PATENTS

| 11,040 | Great Britain | of 1907 |
| 133,067 | Great Britain | Oct. 9, 1919 |